United States Patent Office 3,017,261
Patented Jan. 16, 1962

---

3,017,261
RECOVERY OF ZINC FROM ZINC-CONTAINING MATERIALS
John Lumsden, Avonmouth, England, assignor to Metallurgical Processes Limited, Nassau, Bahamas, a corporation of Bahamas, and The National Smelting Company Limited, London, England, a British company, doing business together as Metallurgical Development Company, Nassau, Bahamas
No Drawing. Filed July 24, 1959, Ser. No. 829,210
Claims priority, application Great Britain Aug. 21, 1958
5 Claims. (Cl. 75—24)

This invention relates to a process for recovering zinc from zinc-containing materials that consist chiefly of oxidic compounds but contain also some sulphur. More especially, it relates to the recovery of metallic zinc from zinc-containing metallurgical slags such as the slags tapped from lead blast furnaces.

According to a known process, a mixture of pulverized coal with insufficient air for its complete combustion, is injected into a pool of molten zinc-containing slag, whereby zinc vapour is liberated, secondary air then being introduced above the level of the slag pool, to complete the combustion of carbon monoxide to carbon dioxide and to oxidize the zinc vapour to a zinc-oxide fume which, after the gases have been cooled, is collected in a baghouse or by other means. Nearly all the lead present in the slag is volatilized also and collected with the zinc-oxide fume.

According to another known process, electrothermic heat is supplied to the molten slag tapped from a lead blast furnace, whereby most of the zinc contained in the slag is volatilized and condensed as liquid metal. The gas produced in this process consists essentially of zinc vapour and carbon monoxide, and from such a mixture zinc can be condensed in a number of known types of condenser.

It is an object of the present invention to recover metallic zinc from zinc-containing metallurgical slags, especially the slags tapped from lead blast furnaces, by a pyrometallurgical process.

The invention depends upon a realization of the significance of certain thermodynamic properties of slags such as are tapped from a lead-smelting blast-furnace. The main components of these slags are iron oxide, lime, silica, and zinc oxide, and they contain a small amount of lead. The properties of these slags can be explained if it be assumed that they consist of charged atoms, the cations being, for example, $Fe^{2+}$, $Fe^{3+}$, $Zn^{2+}$, and $Pb^{2+}$, while the anions are $O^{2-}$ and $S^{2-}$. Some of the equilibria that are important for the invention can then be written as follows:

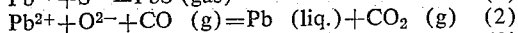
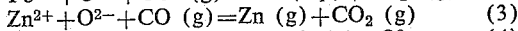
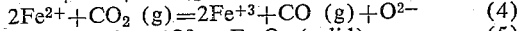
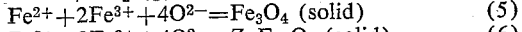
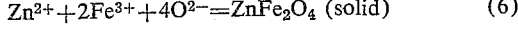

$$Pb^{2+} + S^{2-} = PbS \text{ (gas)} \quad (1)$$
$$Pb^{2+} + O^{2-} + CO \text{ (g)} = Pb \text{ (liq.)} + CO_2 \text{ (g)} \quad (2)$$
$$Zn^{2+} + O^{2-} + CO \text{ (g)} = Zn \text{ (g)} + CO_2 \text{ (g)} \quad (3)$$
$$2Fe^{2+} + CO_2 \text{ (g)} = 2Fe^{+3} + CO \text{ (g)} + O^{2-} \quad (4)$$
$$Fe^{2+} + 2Fe^{3+} + 4O^{2-} = Fe_3O_4 \text{ (solid)} \quad (5)$$
$$Zn^{2+} + 2Fe^{3+} + 4O^{2-} = ZnFe_2O_4 \text{ (solid)} \quad (6)$$

Reaction 1 shows that, at a given temperature, the pressure of lead sulphide over a slag is proportional to the product of the concentrations of lead ions and sulphide ions. Equation 2 shows that, if the $CO_2/CO$ ratio in the gas falls below a certain figure, the lead ions in the slag will be reduced to lead metal. Therefore, for a given total amount of lead present, the pressure of lead sulphide over the slag will be fixed, so long as the $CO_2/CO$ ratio is high enough to prevent any reduction to lead metal. Equation 3 shows that the concentration of the zinc vapour in the gas is inversely proportional to the $CO_2/CO$ ratio and proportional to the concentration of zinc ions.

Equation 4 shows that the ratio of ferric to ferrous ions in the solution is proportional to the square root of the $CO_2/CO$ ratio. Equation 5 shows that, with sufficient iron oxidised to the ferric state a point can be reached at which magnetic separates from solution. Equation 6 shows that, with sufficient ferric iron present, zinc ferrite can be precipitated; actually, the zinc ferrite forms solid solution with magnetite. If, therefore, the $CO_2/CO$ ratio rises above a certain figure, a solid solution of zinc ferrite and magnetite separates.

Up to this higher $CO_2/CO$ ratio at which magnetite separates, raising the $CO_2/CO$ ratio reduces the amount of zinc reduced. Therefore, to volatilize lead sulphide with the minimum amount of zinc, the $CO_2/CO$ ratio is controlled to be near that at which magnetite separates. Under these conditions, nearly all the lead can be removed as sulphide without reducing much zinc. If, now, a lower $CO_2/CO$ ratio is produced in the gas, the zinc can be reduced and volatilized.

It has been found that if pulverized carbonaceous fuel, with sufficient air to burn the carbon to a mixture of carbon monoxide and carbon dioxide (the $CO_2/CO$ ratio being preferably 0.4 to 1.2) is blown into the molten zinc-containing slag from a lead blast furnace, and the gases are then conducted to a lead-splash condenser, most of the zinc can be reduced and condensed as liquid metal, but some is converted to a dross inside the condenser. Practically all the lead is volatilized but it has been found that, the higher the lead content of the slag, the poorer is the condensation efficiency.

It has been further discovered that, with a low lead content of the slag, a good condensation efficiency is obtained when the pulverized fuel consists of coke and is thus of low hydrogen content, and that a lower condensation efficiency is obtained if bituminous coal, or other fuel containing a considerable amount of hydrogen, is used.

The invention consists of a process of recovering zinc metal from molten zinc-containing slag of low lead content in which pulverized carbonaceous fuel of low hydrogen content is blown into the molten slag with sufficient air to generate a mixture of carbon dioxide and carbon monoxide that will reduce and volatilize the zinc contained in the slag, and the zinc vapour is then condensed to yield zinc metal.

In this process of recovering metallic zinc from the slag, it is desirable that the zinc that has not been recovered as liquid metal should be returned to the system for subsequent recovery as metal. The zinc that escapes from the lead-splash condenser can be recovered by water washing, and the zinc so recovered as powder is found to contain a large amount of lead; the dross formed in the condenser also contains lead. If these lead-zinc materials are incorporated in the slag being treated, it is found that the condensation efficiency becomes poorer and still more lead-zinc materials are produced, and to keep all the zinc in the circuit, more have to be returned to the slag being treated, with a further impairment of condensation efficiency. It has thus proved impracticable to follow the obvious procedure of returning the by-products to the furnace for recovery of the contained zinc.

In one method of overcoming this difficulty, these lead-zinc by-products are incorporated with the materials charged to the lead blast-furnace. The lead is then recovered as lead bullion, and the zinc is obtained in the slag ready for retreatment.

Preferably, therefore, zinc drosses which contain also lead are sintered together with zinc-containing lead concentrates to produce a sinter which is charged to a lead-smelting blast-furnace, and lead metal, together with a zinc-containing slag of low lead content is tapped from the blast-furnace, this molten slag then being treated by the process of the invention for the recovery of zinc metal.

If the slag to be treated is of high lead content, it has been found that the lead can be removed by blowing into it carbonaceous fuel together with approximately sufficient air to burn the carbon to carbon dioxide.

The invention therefore also consists of a process of recovering zinc from molten zinc-containing slag in which the slag is first blown with a carbonaceous fuel mixed with such a proportion of air as to produce a relatively oxidizing gas, in order to remove lead and sulphur and is subsequently blown with a low-hydrogen carbonaceous fuel mixed with such a proportion of air as to produce a relatively reducing gas in order to reduce the zinc and remove it as metallic zinc vapour.

Conveniently, fuel (which may contain either only carbon or both carbon and hydrogen as main combustible components), is blown into a molten zinc-containing slag with approximately sufficient air for the complete combustion of the hydrogen to water vapour and the carbon to carbon dioxide and the slag, after this treatment, is then run into another furnace where coke (or other carbon fuel low in hydrogen content) is blown into the molten slag with sufficient air to burn the carbon to a gas containing more carbon monoxide than carbon dioxide, this gas being conducted to a lead-splash condenser. A good recovery of zinc metal is obtained.

A primary object of the treatment of the slag with a relatively oxidizing gas is the removal of lead, since it is the volatilization of lead as lead sulphide that is the chief cause of poor condensation efficiency when zinc is reduced and volatilized from the untreated slag. In a typical slag, the amount of lead originally present is generally less than is required to form lead sulphide with the sulphur in the slag and, although the sulphur eliminated is at least chemically equivalent to the lead eliminated, a considerable fraction of the sulphur remains in the slag, while the elimination of the lead is much nearer to completion. After the de-leading treatment, the main remaining interference with condensation efficiency in the subsequent zinc volatilization process is due to sulphur compounds other than lead sulphide. Addition of lead is a particularly effective means of promoting sulphur removal.

To obtain further improvement of the subsequent condensation efficiency it is therefore sometimes convenient to incorporate with the molten slag, during its treatment with the relatively oxidizing gas, some lead-oxide dross or other plumbiferous dross material of low sulphur content. It is found that if lead is added until the lead content, by weight, is about four times the sulphur content, the removal of lead can still be effected fairly completely; further addition of lead, while continuing to favour sulphur removal, causes the lead removal to become less complete.

When pulverized coke, mixed with air in such proportions as to produce a gas containing carbon monoxide and carbon dioxide, is blown into a metallurgical slag the main components of the gas are nitrogen, carbon monoxide, carbon dioxide and zinc vapour. It is found however, that the various components of the slag are carried away by the gases to a certain extent. According to the findings, it appears that some of these components are carried away as liquid particles in the gas, while others are contained in the gases as vapours of elements or compounds. It has further been found that the particles of slag carried away can be prevented from reaching the condenser in large amounts by conventional means, such as by providing suitable space above the slag bath in a region where the gas velocity is not too great for allowing the particles to fall back into the slag bath, or by interposing a coke filter in the path of the gas, or by causing the gases to suffer a sudden change of direction, or by a combination of such methods. The components which leave the slag bath in the vapour state cannot, however, be removed by such treatment. When the vaporous impurities reach the condenser they are converted to solid compounds which act as nuclei for formation of dross and prevent efficient condensation of zinc metal.

Three elements that are vaporized from the slag bath in considerable amounts are lead, silicon and sulphur. The exact forms in which these elements are volatilized is not certain, but it appears likely that when the gas produced contains comparable amounts of carbon monoxide, and carbon dioxide, the lead is vaporized partly as lead metal and partly as lead sulphide, some compound containing both silicon and sulphur is volatilized and some hydrogen sulphide is formed if the fuel used contains much hydrogen.

The treatment of the slag according to the invention, to remove lead and sulphur, is carried out under such conditions that the gaseous products of combustion of the fuel have a higher ratio of carbon dioxide to carbon monoxide than is used for the subsequent reduction of zinc from the slag. In order to prevent any large amount of zinc being reduced, it is necessary to generate a gas containing such a high ratio of carbon dioxide to carbon monoxide that an appreciable amount of the iron oxide in the slag becomes oxidized from the ferrous to ferric condition. This means that the fuel may be supplied with approximately the amount of air needed for complete combustion or with slightly more air than is needed for complete combustion, but that the gas produced can still maintain some carbon monoxide (and hydrogen) with no free oxygen. A practical upper limit is set to the $CO_2/CO$ ratio in the actual gas produced by the consideration that it is undesirable to have the gas sufficiently oxidizing to form solid magnetite or zinc ferrite. Subject to this upper limit, the elimination of zinc from the slag is suppressed and the elimination of sulphur promoted by increasing the $CO_2/CO$ ratio in the gas, the elimination of lead not being greatly affected. In general, therefore, it is desirable to operate as near to this upper limit as possible. With typical slags, oxidation to magnetite probably starts with a gas that is actually burnt about 97% to completion (this implies a $CO_2/CO$ ratio of 94:6 and an $H_2O/H_2$ ratio of 97:3). To produce such a gas it is found that the fuel has to be supplied with more air than is required for complete combustion of the carbon to carbon dioxide and the hydrogen to water vapour.

For efficient operation, with respect to avoiding zinc removal, the fuel should be supplied with at least sufficient air to effect combustion of all the carbon to carbon dioxide and all the hydrogen to water vapour. For any particular slag, the extent to which the air/fuel ratio should be increased above this amount can be determined by finding the air/fuel ratio at which oxidation to magnetite occurs and keeping the air/fuel ratio, say, 5% below this critical value. In general, magnetite formation begins to occur when the air is used about 1.1 times the amount required to effect complete combustion of all the fuel. As a general recommendation, the use of an amount of air 5% in excess of that required to burn all the fuel to carbon dioxide and water vapour has the advantage that it will always ensure against magnetite formation and will not produce any large volatilization of zinc.

In the operation of a lead blast-furnace, it has been found that having too high a percentage of lead in the charge leads to unsatisfactory furnace operating conditions. When high-grade lead concentrates are being treated, it has been found necessary to incorporate some diluent in the charge, and some of the slag is often granulated and used for this purpose.

A lead blast-furnace plant that has been treating zinciferous lead concentrates will have accumulated a stock of zinciferous slag. If such a plant now uses the process of the present invention, the slag used as diluent for the blast-furnace charge can be obtained from the stock of old zinciferous slag. The process of the invention then provides a means of recovering as metallic zinc both the zinc contained in the lead concentrates currently being used and the zinc contained in the stocks of old slag.

When the slag to be treated is obtained molten from a furnace, and the fuel used for the removal of lead and sulphur from the slag is low-hydrogen coal, the amount of carbon required in the coal is generally between 3% and 6% of the weight of slag. If a fuel containing both hydrogen and carbon is used, the amount required can be calculated as that equivalent in calorific value to the above range of carbon consumptions.

This treatment removes nearly all the lead, together with some of the sulphur. The removal of all the lead makes it possible to conduct the subsequent zinc-reduction operation so as to obtain a fairly good condensation efficiency of zinc; lead, in conjunction with sulphur, is the most detrimental agent in impairing condensation efficiency, sulphur in the absence of lead exerting less effect. If the fuel is introduced with just enough air for its complete combustion, the amount of sulphur eliminated is somewhat in excess of that chemically equivalent to the lead, this probably indicating that most of the lead is volatilized as lead sulphide and that some sulphur is volatilized in other forms. As the air/fuel ratio is increased the amount of sulphur volatilized increases; it seems likely that it is volatilized as sulphur vapour and sulphur dioxide. The chief advantage of operating close to the point at which magnetite would separate is that this enables the sulphur elimination from the slag to be improved.

It is convenient to introduce into the gases leaving the slag treatment bath, an excess of air to convert the lead sulphide to lead sulphate and other sulphate compounds to sulphur dioxide. The gases may then be passed through a boiler, to utilize their sensible heat to raise steam, and then to a baghouse to collect the fume of lead sulphate, containing only a little zinc oxide. The gases are then scrubbed (by water, with or without addition of alkalis such as lime) to remove sulphur dioxide. A portion of these gases may be mixed with the air injected into the slag bath; this improves sulphur elimination from the slag for a given amount of fuel burnt.

The molten slag, de-leaded and partially de-sulphurized, is then conducted to a second furnace. Here pulverized carbonaceous fuel is injected, mixed with such an amount of air that the products of combustion are able to reduce zinc from the slag to yield a gas from which zinc can be condensed, in a lead-splash condenser; the fuel used should be low in hydrogen content since water vapour interferes with zinc condensation; suitable fuels are steam coal, coke and anthracite. In general, the air added with the pulverized fuel should be between 60% and 75% of that required for complete combustion; these primary products of combustion reduce zinc, and also effect some reduction of ferric to ferrous iron in the slag; in the gases leaving the condenser the volume ratio $CO_2/CO$ is preferably between 0.4 and 1.2. As applied to a slag containing 17% to 18% of zinc the carbon requirement is generally between 18% and 25% of the slag weight.

The lead-zinc residuals obtained from the condenser and the water scrubbers are usually incorporated with the materials charged to the lead blast-furnace. In so far as they are low in sulphur content, however, they may be incorporated with the slag for the de-leading and de-sulphurization treatment with the relatively oxidizing gas.

Various modifications may be made in accordance with the invention.

I claim:

1. A process for recovering metallic zinc from a molten zinciferous slag run off from a lead-smelting blast-furnace, in which, firstly, carbonaceous fuel, together with air containing approximately sufficient oxygen to burn the carbon to carbon dioxide and any hydrogen contained in the fuel to water vapour, is blown into the molten slag, whereby most of the lead and a small amount of the zinc are volatilized and, secondly, carbonaceous fuel of low hydrogen content, together with air containing at least sufficient oxygen to burn the carbon to carbon monoxide but insufficient to burn the carbon to a mixture of equal volumes of carbon monoxide and carbon dioxide, is blown into the molten slag, whereby the zinc in the slag is reduced and volatilized, and the zinciferous gases are conducted to a condenser for the recovery of zinc as metal.

2. A process according to claim 1 in which the zinciferous gases are brought into intimate contact with molten lead to condense the zinc while inhibiting oxidation of zinc by carbon dioxide.

3. A process according to claim 1 in which the lead and zinc volatilized during the first treatment of the slag with carbonaceous fuel are recovered from the gases and returned to the charge for the lead-smelting blast-furnace.

4. A process according to claim 2, in which any zinc not recovered as metal during the condensation from the zinciferous gases is recovered as materials containing also lead, and these zinc-lead materials are incorporated with the charge to the lead-smelting blast-furnace.

5. In the process of smelting zinciferous lead-containing materials in a blast-furnace for the recovery of lead metal and the production of a zinciferous slag, the improvement that comprises two successive operations of injecting a mixture of carbonaceous fuel and air into the molten zinciferous slag run off from the blast-furnace, the air used during the first operation containing approximately sufficient oxygen to burn all the carbon contained in the fuel to carbon dioxide and all the hydrogen to water vapour, whereby most of the lead contained in the slag is volatilized together with some of the sulphur and a small portion of the zinc, the volatilized lead and zinc being recovered and incorporated with the charge to the blast-furnace and the fuel used during the second operation being of low hydrogen content, with the air containing sufficient oxygen to burn the carbon to a mixture of carbon dioxide with at least an equal volume of carbon monoxide, whereby zinc is reduced and volatilized to give zinciferous gases, which are conducted to a condenser where they are brought into intimate contact with molten lead, and most of the zinc is recovered as zinc metal and the balance of the zinc is recovered as a lead-zinc material, which is incorporated with the charge to the blast-furnace.

References Cited in the file of this patent

UNITED STATES PATENTS 2,816,022    Morgan et al. _____ Dec. 10, 1957

FOREIGN PATENTS 256,601    Great Britain _____ Mar. 24, 1927